United States Patent [19]

Nobiraki et al.

[11] Patent Number: 4,790,863
[45] Date of Patent: Dec. 13, 1988

[54] AIR CLEANER

[75] Inventors: Koji Nobiraki, Yamatokooriyama; Yoshiharu Metoku, Sakai; Hisato Uragami, Nara; Toshitaka Tamaki, Yamatokooriyama; Keiji Yoshimura; Kazihiko Otsuka, both of Nara, all of Japan

[73] Assignee: Nitta Co., Ltd., Osaka, Japan

[21] Appl. No.: 53,470

[22] Filed: Apr. 23, 1986

Related U.S. Application Data

[63] Continuation-in-part of Ser. No. 682,514, Dec. 17, 1984, abandoned.

[30] Foreign Application Priority Data

Dec. 16, 1983 [JP] Japan .................................. 58-237545
Dec. 19, 1983 [JP] Japan .................................. 58-240565
May 4, 1984 [JP] Japan .................................. 59-065885
Jun. 14, 1984 [JP] Japan .................................. 59-122323

[51] Int. Cl.$^4$ ............................................. B01D 46/00
[52] U.S. Cl. ........................................ 55/276; 55/473; 55/484; 55/385.1; 98/40.1; 98/39.1; 98/40.05
[58] Field of Search ................... 55/467, 276, 470-473, 55/484, 385 A; 98/40.1, 40.5, 39.1; 415/121 G, 206

[56] References Cited

U.S. PATENT DOCUMENTS 3,721,067  3/1973  Agnew ............................. 55/385 A
3,802,168  4/1974  Deckas ................................ 55/473
4,427,427  1/1984  De Vecchi ........................... 55/484
4,549,472  10/1985  Endo et al. ......................... 98/31.5

FOREIGN PATENT DOCUMENTS 2318309  11/1974  Fed. Rep. of Germany ... 415/121 G
78200  6/1980  Japan .............................. 415/121 G Primary Examiner—Bernard Nozick
Attorney, Agent, or Firm—Armstrong, Nikaido, Marmelstein & Kubovcik

[57] ABSTRACT

An air cleaner comprising a thin lightweight fan module having at least one fan, at least one casing containing one fan therein and at least one housing containing one casing therein; a thin lightweight air filter module having an air filter; and an air flow moderator disposed between the fan module and the air filter module.

6 Claims, 8 Drawing Sheets

AIR CLEANER

REFERENCE TO RELATED APPLICATION

This is a continuation-in-part of the copending application Ser. No. 682,514, filed on Dec. 17, 1984 now abandoned.

BACKGROUND OF THE INVENTION

1. Field of the Invention

This invention relates to a thin lightweight noiseless air cleaner having a high collection efficiency and an air cleaning system using the same.

2. Description of the Prior Art

A sufficiently purified environment is required in precision machinery industries for the production of semiconductors, pharmaceutical industries, hospitals, research institutes in the field of biotechnology, etc. Depending on the situation air quality might need to be controlled in a single bench area, in a regulated booth or even in an entire room. Air purification has been accomplished by, for example, an air cleaning system such as the one shown in FIG. 13, which is composed of a plurality of filter units 100, each of which is fixed on supporters 400 from a ceiling (not shown). Spacers 500 and caulking compounds 600 must be positioned in the space between the filter units 100, making installation complicated. The resulting sealing system is not enough to prevent a certain amount of air leakage. As shown in FIG. 14, these units 100 may be installed on a ceiling by supporters 400, each of which has a rectangular frame 101. Although a gasket 601, such as a chloroprene sponge, is positioned between the filter frame 102 and the rectangular frame 101, air leakage therefrom cannot be avoided. Furthermore even the airtight connection 105 between the air filter module 103 and the fan module 104 in each unit 100 cannot prevent all air leakage.

In addition, the filter module 103 and the fan module 104 constituting the above-mentioned filter unit 100 are large and heavy, so that the filter unit 100 is correspondingly bulky and heavy as a whole. Subsequently, the unit is noisy and difficult to install, inspect and repair. Replacement of parts such as the fan, filter, etc., are also difficult due to the size and weight.

SUMMARY OF THE INVENTION

The thin lightweight air cleaner of this invention which overcomes the above-discussed disadvantages and other numerous drawbacks of the prior art, comprises a thin lightweight fan module having at least one fan, at least one casing containing one fan therein and at least one housing containing one casing therein; a thin lightweight air filter module having an air filter; and an air flow moderator disposed between the fan module and the air filter module.

When two or more fans are employed, the two adjacent housings in which the fan casings face each other with respect to their outlets are, in a preferred embodiment, divided by a common partition for the separation of the air flow from the fan casings into two portions, thereby regulating the direction of each of the separated air flows.

Each moderator is, in a preferred embodiment, positioned in a manner to form a clearance, through which air flow from the fan passes from the moderator to the air filter module, between the end of the moderator and the housing.

Each moderator has, in a preferred embodiment, on its end, a blocking plate with a certain length along the clearance, the blocking plate functioning to prevent air flow from the fan from flowing around the fan casing.

Each casing is, in a preferred embodiment, eccentrically positioned within the housing of the fan module to create a large space in front of the outlet of the fan casing.

The two adjacent housings in which the fan casings face each other are, in a preferred embodiment, separated by a partition in such a manner that the end portion of the outlet of the casing in the housing is connected by the partition to the end portion of the outlet of the other casing, thereby regulating the direction of each of the air flows from fan casings.

The housing is, in a preferred embodiment, provided with vibration and noise absorbers.

Each fan is a propeller-type fan or a sirocco fan.

Each fan is, in a preferred embodiment, provided with a resonance prevention device at its back. The resonance prevention device is, in a preferred embodiment, a flywheel.

The thin lightweight air cleaner system of this invention which overcomes the above-discussed disadvantages and other numerous drawbacks of the prior art, comprises (1) a latticework of interconnected H-shaped channels having their openings directed upwardly and a sealing liquid positioned therein, (2) a plurality of air filter modules, each of which includes an air filter and has a surrounding frame containing a continuous U-shaped channel; the U-shaped channel having an upwardly directed opening and a sealing liquid positioned therein, and the upward opening of the U-shaped channel receiving the lower rim of the H-shaped channel, and (3) a plurality of fan modules, each of which includes a fan, a casing containing the fan therein and a housing containing the casing therein, and is disposed at the back of each of the air filter modules, the fan module having a surrounding frame containing a continnuous vertically disposed extension which rests in the upward opening of the H-shaped channel.

The air filter module is thin and lightweight. The fan module is, likewise, thin and lightweight.

Each fan is a propeller-type fan or a sirocco fan.

Each housing is, in a preferred embodiment, provided with vibration and noise absorbers.

Each fan is, in a preferred embodiment, provided with a resonance prevention device at its back.

Thus, the invention described herein makes possible the objects of (1) providing an air cleaner which has a high collection efficiency and an excellent ventilation ability; (2) providing a noiseless air cleaner; (3) providing an air cleaner, which is thin and lightweight; (4) providing an air cleaner which produces a uniform rate of air flow; (5) providing a small-sized air cleaner which can be installed in a small space; (6) providing an air cleaning system which is composed of the above-mentioned air cleaner and in which complete airtightness can be maintained; (7) providing an air cleaning system wherein the fan module and/or the filter module can be readily exchanged for another without damaging the airtightness between both modules; (8) providing an air cleaning system which is readily installed and repaired due to the use of a thin lightweight fan and filter modules; both of which are combined with each other by a simple sealing system; (9) providing an air cleaning system which can be readily subjected to inspection and/or maintenance because of its simple structure and simple sealing system; and (10) providing a system which is energysaving.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
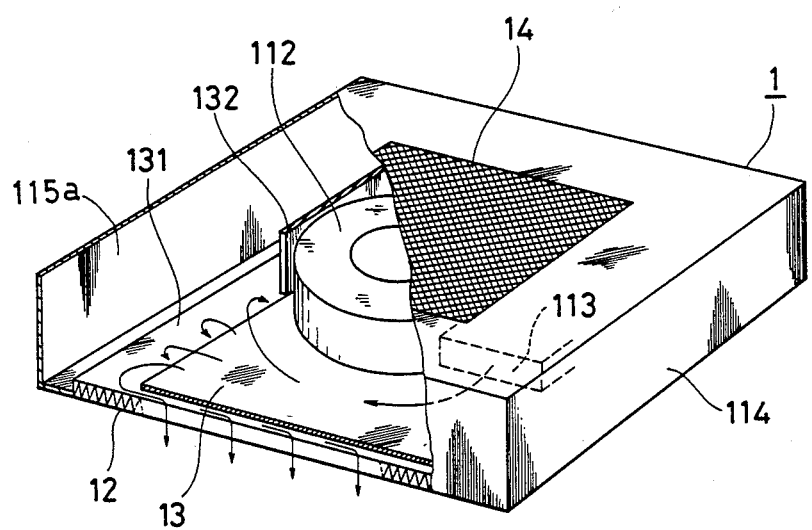
FIGS. 1(a) and 1(b), respectively, are a perspective view and a sectional back view showing an air cleaner of this invention which is cut in part.
Figure 1B:
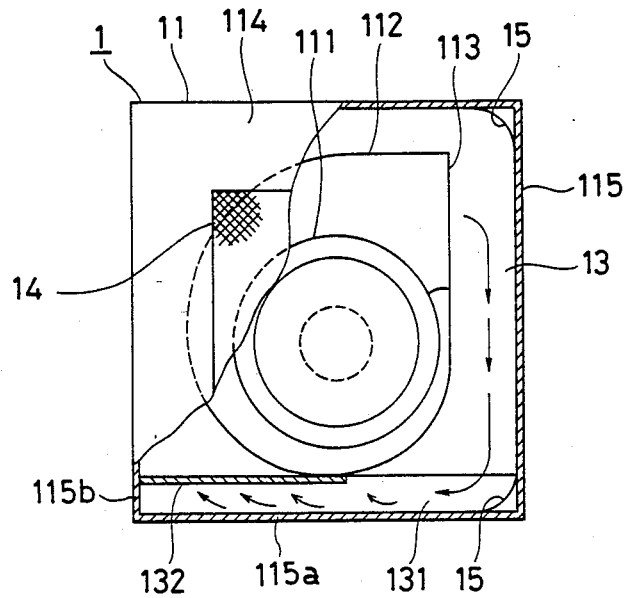

FIGS. 1(a), 1(b), 2 and 3 show an air cleaner 1 of this invention, which comprises a fan module 11 having a sirocco fan 111, a casing 112 containing the fan 111 therein and a housing 114 containing the casing 112 therein; and an air filter module 12 having an air filter 121. The thickness of the fan 111 (i.e., the thickness of the fan module 11) is ½ or less than that of the prior art, creating a thin air cleaner. The filter 121 has a collection efficiency of 99.97% with respect to dioctylphthalate particles of a size of 0.3 μm in a monodisperse system. An example of the filter 121 is an HEPA (High Efficiency Particulate Air) filter. The thickness of the filter module 12 containing such an HEPA filter is, for example, as thin as 100 mm or less, while that of a conventional filter module is 150 mm. A prefilter 14 can be positioned at the back of the fan 111 as desired. A guide vane 15 is positioned at each corner of the housing 114 to avoid turbulence from air discharged from the outlet 113 of the fan casing 112 as it collides with the wall 115 of the housing 114, forming a turbulent flow. The guide vane 15 can be a plastic board, etc., but is not limited thereto.

The air flow from the outlet 113 of the fan casing 112 is not uniform with respect to dynamic pressure thereof in the whole region of the outlet 113, because the rate of the air flow within the circular duct within the casing 112 is greater along the inner diameter of the duct than along the outer diameter thereof. While the air flow, having an ununiform dynamic pressure, reaches the filter 121, passing through the significantly long path between the fan casing 112 and the housing 114, the dynamic pressure is gradually reduced to a static pressure. In order to make the path of the air flow longer, a moderator 13, such as a plastic board, etc. is positioned between the fan module 11 and the filter module 12 in such a manner that a clearance (or opening) 131 is formed from the wall 115 of the housing 114 to the wall 115b of the housing 114 facing the said wall 115 in parallel with the wall 115a of the housing 114 which is adjacent to the wall 115 of the housing 114. A blocking plate 132 is airtightly fixed on the edge of the moderator 13 from the wall 115b of the housing 114 to the casing 112, with which the end of the blocking plate 132 airtightly comes into contact. An air flow from the outlet 113 of the fan casing 112 is fed into the space between the moderator 13 and the filter module 12, passing through the said clearance 131. While the air flow which is not uniform with respect to the dynamic pressure passes through the moderator 13 and the filter module 12, the dynamic pressure is reduced to a static pressure. The air flow having a reduced dynamic pressure collides with the whole back face of the filter 121 and passes therethrough with a uniform distribution flow rate.

Figure 4:
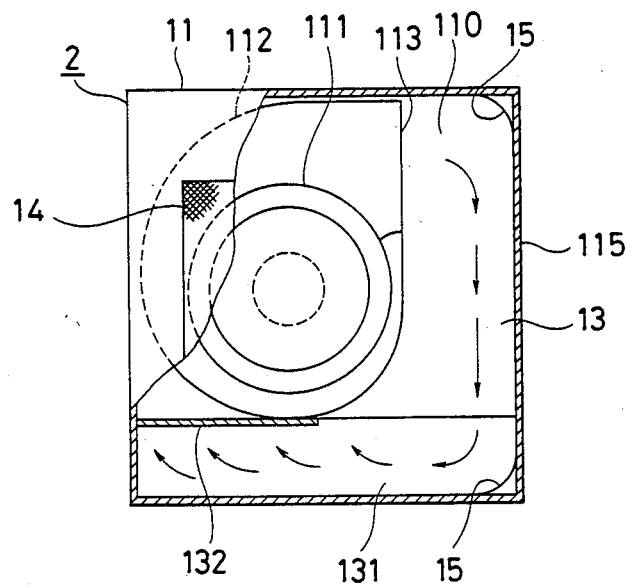
FIG. 4 is a sectional back view of another air cleaner of this invention which is cut in part.

FIG. 4 shows another air cleaner 2, in which the casing 112 of the fan 111 is eccentrically positioned within the housing 114 of the fan module 11 to create a large space 110 in front of the outlet 113 of the casing 112. As soon as air is discharged from the casing 112 into the large space 110, its dynamic pressure is reduced forming a gentle flow, which, then, comes into the path between the moderator 13 and the filter module 12 to create an even more gently flow. Thus, the significantly gentle air flow is fed into the back face of the filter 121.

Figure 5:
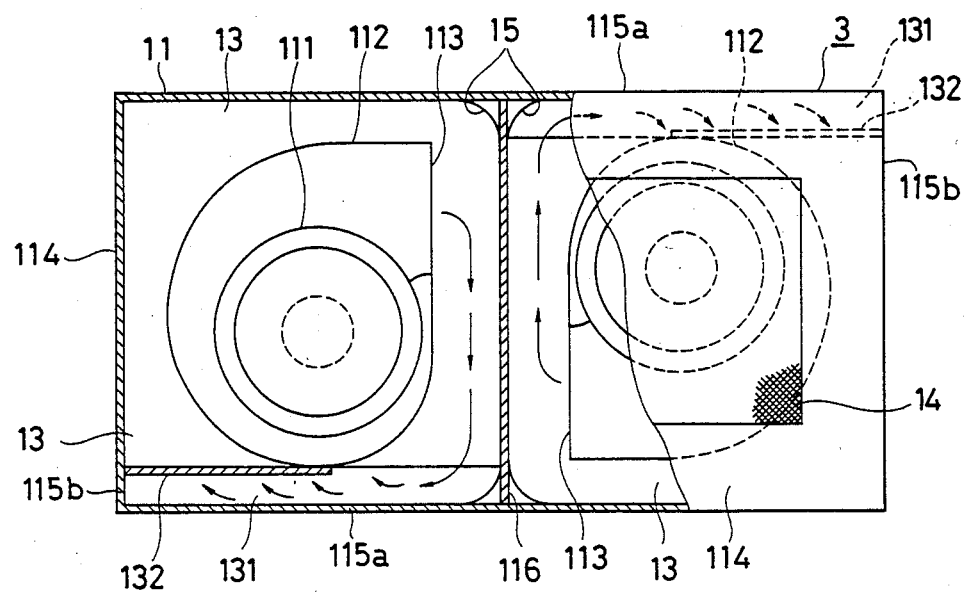
FIGS. 5, 6 and 7, respectively, are a sectional back view, a sectional plan view and a partly sectional side view of another air cleaner of this invention which is cut in part.
Figure 6:
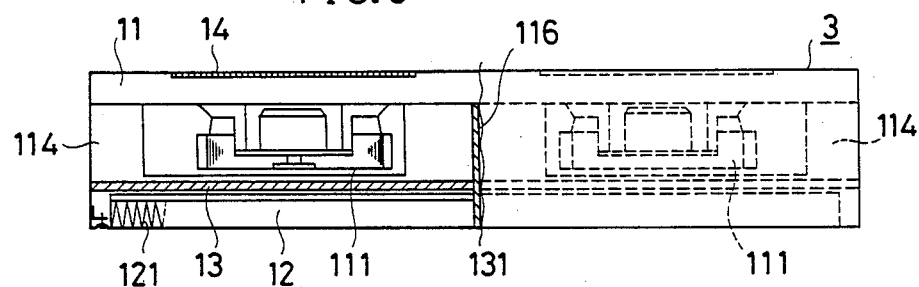
Figure 7:
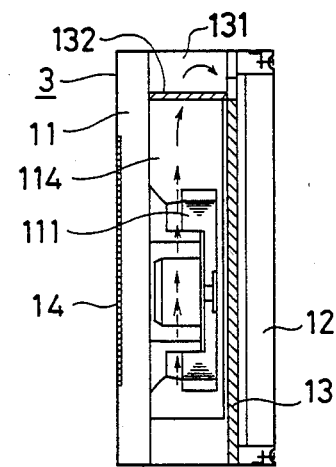

FIGS. 5, 6 and 7 show another air cleaner 3 according to this invention, in which a pair of fan casings 112 are disposed facing each other with respect to their outlets 113. Each of the fan casings 112 is positioned in each of the two adjacent housings 114 which are divided by a partition 116 serving to prevent an interference of the air flow from the outlets 113 of the fan casings 112 and create a low level of noise from the air cleaner 3. The noise produced by the air cleaner 3 provided with the partition 116 according to this invention was 50 dB(A), while that from an air cleaner having no partition was as high as 55 dB(A).

Guide vanes 15, which are positioned at the corner of the housing 114, are effective to avoid an interference phenomenon deriving from the air discharged from the fan casings 112. The partition 116 and the guide vane 15 may be made of plastics, etc., but are not limited thereto.

This air cleaner 3 is also provided with a moderator 13 such as a plastic board, etc., which is positioned between the fan module 11 and the filter module 12 in such a manner that a clearance (or opening) 131 is formed from the partition 116 to the wall 115b of the housing 114 in parallel with the wall 115a of the housing 114 which is adjacent to the partition 116, resulting in reduced dynamic pressure of the air flow from the fan 111 for the same reasons as in the above-mentioned cleaner 1. A blocking plate 132 is fixed, in the same manner as in the air cleaner 1, on the edge of the moderator 13 from the wall 115b of the housing 114 to the casing 112, with which the end of the blocking plate 132 comes into contact.

Figure 8:
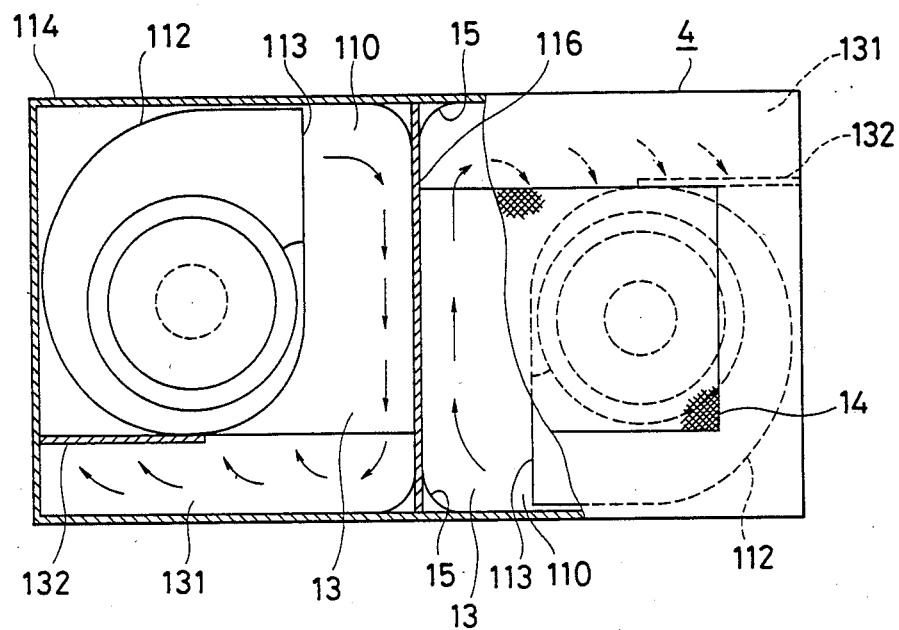
FIG. 8 is a sectional back view of another air cleaner of this invention which is cut in part.
Figure 9:
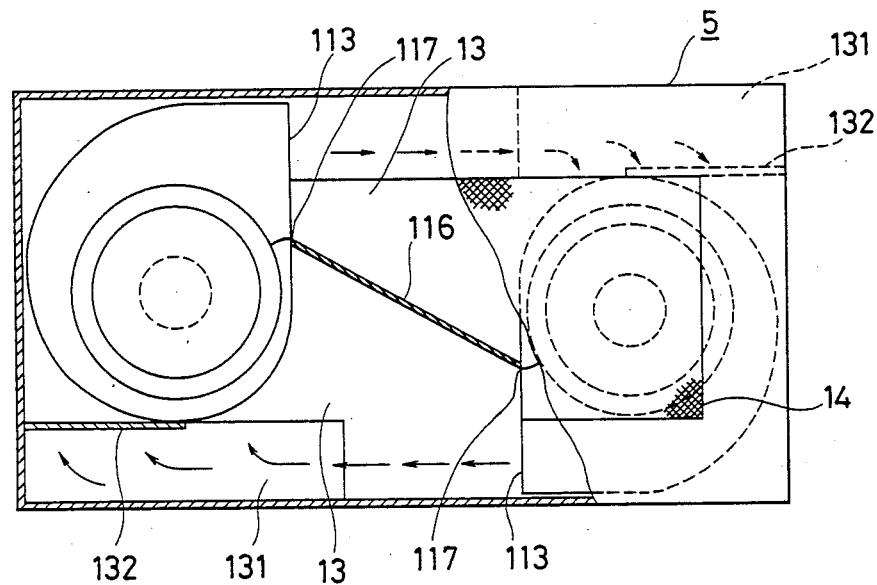
FIG. 9 is a sectional back view of another air cleaner of this invention which is cut in part.

Another air cleaner 4 is shown in FIG. 8, wherein each of the fan casings 112 may be eccentrically positioned within the housing 114 to create a large space 110 before the outlet 113 of the fan casing 112, thereby allowing for the reduction of the dynamic pressure of the air flow from the outlet 113 of the fan casing 112 and resulting in a gentle flow having a static pressure. Then, the gentle flow comes into the path between the moderator 13 and the filter module 12 through the opening 131, becoming even more gentle, and the resulting significantly gentle flow collides uniformly with the whole face of the filter 121 and passes through the filter 121. In order to enlarge the discharge space 110, as shown in FIG. 9, the partition 116 may be positioned in such a manner to connect the end portion 117 of the outlet 113 of the fan casing 112 to the end portion 117 of the outlet 113 of the other casing 112. In this air cleaner 5, the air flow from each of the fans 111 reaches the filter 121 through a different path, that is, the air flow from the fan casing 112 is fed into the filter 121, passing through the opening 131 in front of the outlet 113 of the casing 112.

Figure 10:
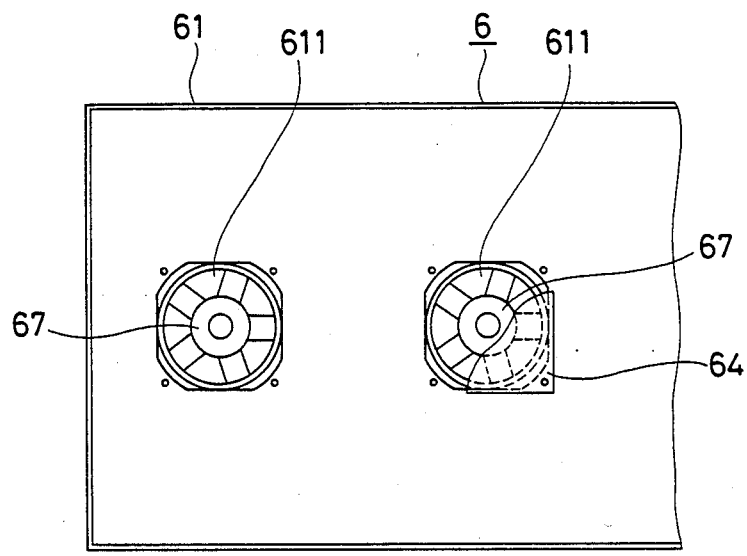
FIGS. 10 and 11, respectively, are a back view and a sectional side view of another air cleaner of this invention which is cut in part.
Figure 11:
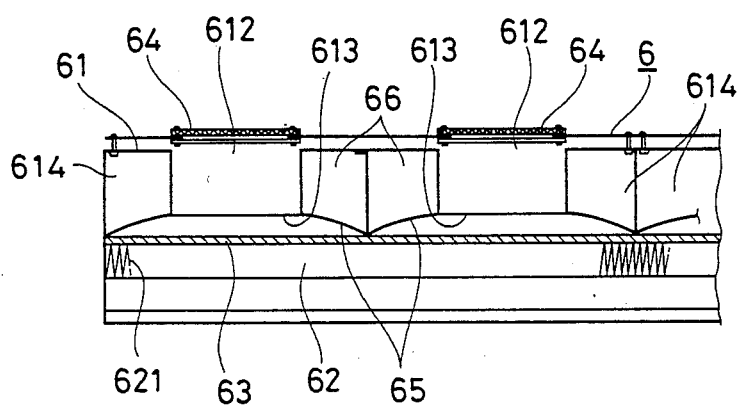

Another air cleaner 6 according to this invention is shown in FIGS. 10 and 11, which comprises a fan module 61 having a propeller-type fan 611, a casing 612 of the fan 611 and a housing 614 containing the fan casing 612 therein, and an air filter module 62 having an air filter 621. A moderator 63 is positioned between the fan module 61 and the filter module 62. The space between the fan casing 612 and the housing 614 is partly or wholly filled with a vibration absorber and/or a noise absorber 66 made of a glass wool and/or a plastic foam such as a polyurethane foam, a polystyrene foam, etc. to reduce vibration and noise from the fan 611.

Since the fan 611 is a thin compact propeller fan, it can operate at a high speed, as compared with a conventional multiblade type-fan, thereby attaining a high ventilation efficiency and an excellent air-flow rate distribution.

The filter 621 in this cleaner 6 is the same as that used in the above-mentioned cleaner 1. A prefilter 64 may be positioned at the back of the fan casing 612 as desired.

Regulators 65 made of an involute- or paraboloid-shaped aluminum or plastic board, etc. are disposed from around the outlet 613 of the casing 612 to the ends of the back of the filter module 62, thereby preventing turbulence of the air flow from the outlet 613 of the fan casing 612 and guiding the air flow to the back of the filter 621. Thus, the ventilation efficiency of the fan 611 and the uniform distribution of the flow rate of the air from the fan 611 to the filter 621 can be maintained at a high level. The occurance of noise can be also reduced.

Figure 12:
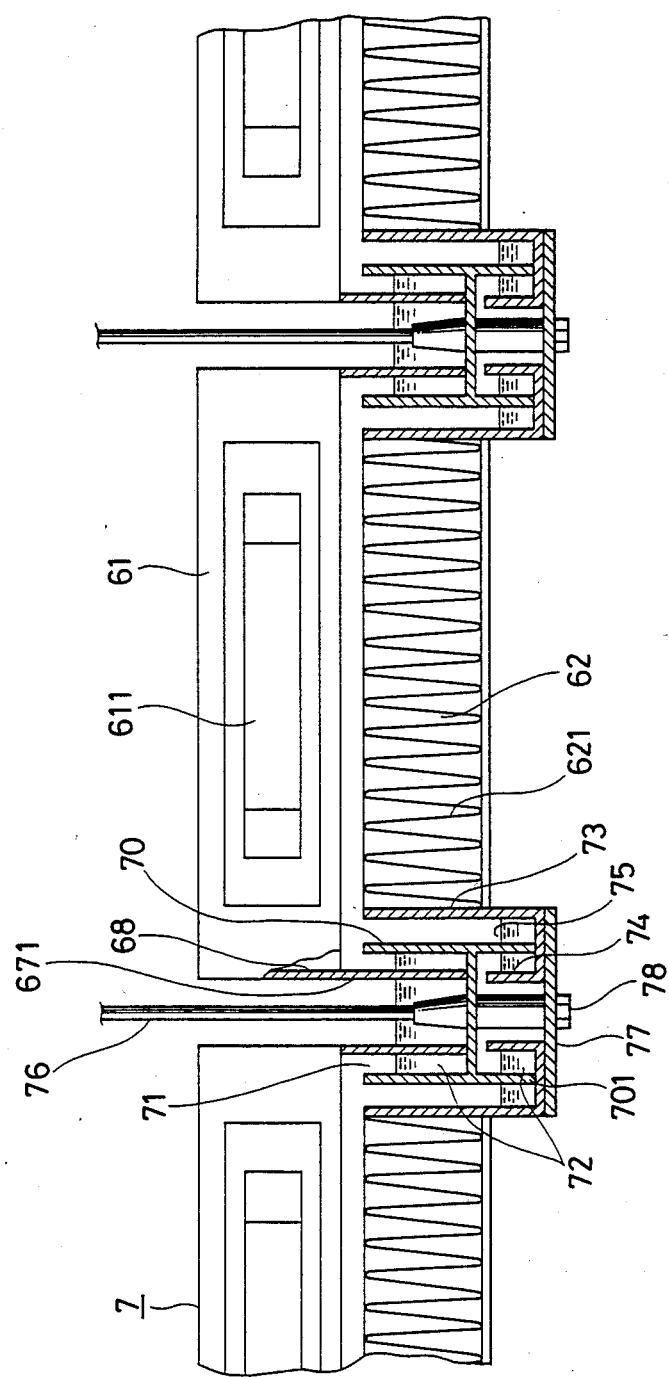
FIG. 12 is a partly sectional side view of an air cleaning system of this invention.
Figure 13:
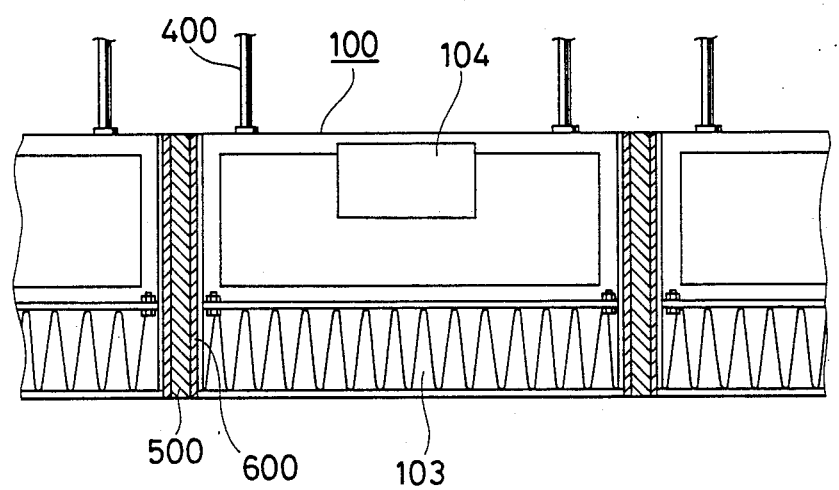
FIGS. 13 and 14, respectively, are partly sectional side views of a conventional air cleaning system.
Figure 14:
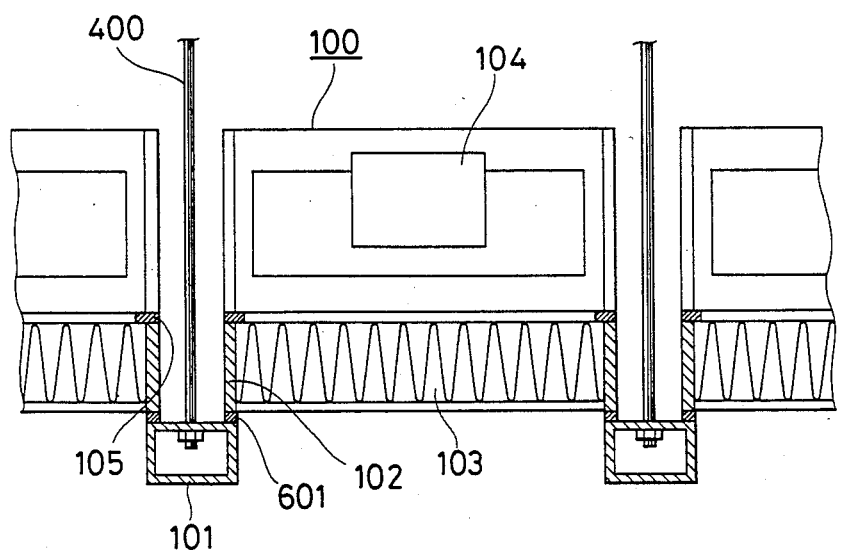

The moderator 63 between the fan module 61 and the filter module 62 serves to make the air-flow rate distribution more uniform. The moderator 63 is made of a porous plastic or aluminum board, etc. having a plurality of openings of a diameter of, for example, 2.5 mm comprising 30% of the surface area of the filter. Upon passing through the moderator 63, the air flow becomes streamlined as it flows downward. Instead of the moderator 63, a thin-type diffuser can be used.

Where a plurality of air cleaners 6 are installed on a ceiling, etc. as shown in FIG. 12, the rotation number of each of the fans 611 varies according to a change in the voltage and/or loading thereby causing a rotation resonance which results in beats, vibrations and noise of the fan 611. In order to avoid such a rotation resonance, a resonance prevention device 67 such as a flywheel is mounted to the back of the fan 611. The resonance prevention device 67 rotates together with the fan 611, maintaining a stable rotation rate due to its inertia force so that surging due to noise interference can be reduced thereby attaining a decrease in a vibration and noise from the fan 611.

FIG. 12 shows an air cleaning system 7, which comprises (1) a latticework of interconnected H-shaped channels 70 having their openings 71 directed upwardly and a sealing liquid 72 positioned therein; (2) a plurality of air filter modules 62 each of which has a surrounding frame 73 containing a continuous U-shaped channel 74, said U-shaped channel 74 having an upwardly directed opening 75 and a sealing liquid 72 positioned therein and said upwardly directed opening 75 of the U-shaped channel 74 receiving the lower rim 701 of said H-shaped channel 70; and (3) a plurality of fan modules 61, each of which has a surrounding frame 68 containing a continuous vertically disposed extension 671 which rests in the upwardly directed opening 71 of the H-shaped channel 70. This air cleaning system 7 further comprises a supporter 76, the end of which is connected to a portion such as a ceiling on which this cleaning system 7 should be installed and the other end of which is connected to a cover 77 by the use of a fastening means 78 such as a screw through the H-shaped channel 70, thereby mounting this air cleaning system 7 horizontally on a ceiling, etc.. The cover 77 also serves to keep the H-shaped channel 70 and the U-shaped channel 74 from sight.

The fan module 61 is the same as that used in the air cleaner 6 shown in FIGS. 10 and 11, or the fan module 11 which is used for the air cleaner 1 shown in FIG. 1.

Figure 2:
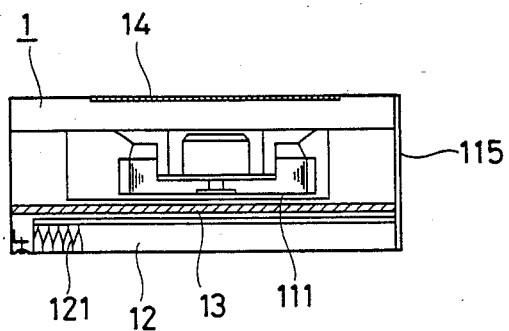
FIGS. 2 and 3, respectively, are a sectional plan view and a sectional side view of the air cleaner shown in FIG. 1.
Figure 3:
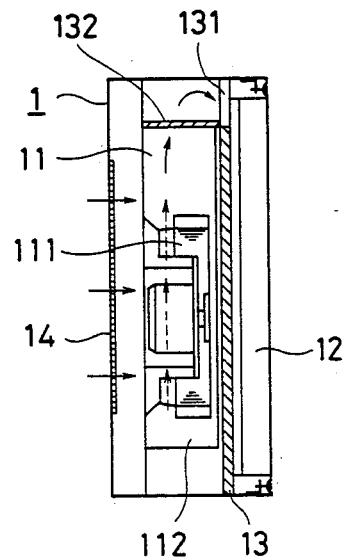

The filter module 62 maybe the same as that used in the air cleaner 1 shown in FIG. 2 or the air cleaner 6 shown in FIG. 11.

The H-shaped channel 70, the surrounding frames 68 and 73 of the fan module 61 and the filter module 62 respectively, and the continuous U-shaped channel 74 all are made of a metal such as aluminum, iron, etc., or a venner or a synthetic resin, but are no limited thereto. The sealing liquid 72 positioned in the openings 71 and 75 is a non-volatile sealant, preferablly having excellent adhesiveness and a long pot life, examples of which are modified-urethane derivatives and silicon derivatives.

Using the air cleaning system 7, a purified air can be created as follows:

As the fan 611 is driven, air is introduced from the outdoors into the back of this cleaning system 7 through a duct (not shown), entering the fan casing 612 through the prefilter 64, and is discharged from the outlet 613 of the casing 612 into the space before the casing 612. Since the fan module 61 is airtightly connected to the filter module 62 by the H-shaped channel 70, the air from the fan 611 can be introduced into the filter 621 through the porous moderator 63 without air leakage.

The discharged air from the fan casing 612 is fed into the porous moderator 63 without causing turbulence due to the regulator 65. The dynamic pressure of the air flow is significantly reduced during passage through the porous moderator 63, forming a streamlined downward flow which has a uniform distribution flow rate, when it reaches the back of the filter 621. The air is cleaned by the filter 621, attaining purified air in the room in which this cleaning system 7 is installed. Since the filter module 62 is also airtightly isolated from the outside by the H-shaped channel 70, untreated air from the outside cannot come into the room.

In order to control the amount of air passing through the filter 621, a non-porous board can be positioned between the fan module 61 and the filter module 62.

This air cleaning system 7 can be readily disassembled by loosing the fastening means 78 and removing in turn the cover 77, the filter module 62 and the fan module 61. After the removal of the filter module 62, the fan module 61 can be subjected to inspection from inside the room.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. An air cleaner comprising a thin lightweight fan module including a housing having an inlet and having at least one fan, at least one casing containing the at least one fan therein having an inlet and an outlet and a thin lightweight air filter frame having a high efficiency particulate air filter; and an air flow moderator plate disposed between three walls of said housing and connected thereto to define a flow path between the fan and plate and the plate and air filter.

2. An air cleaner according to claim 1, wherein two adjacent housings in which the fan casings face each other with respect to their outlets are divided by a common partition for the separation of the air flow from said fan casings into two portions, thereby regulating the direction of each of the separated air flows.

3. An air cleaner according to claim 1, wherein said moderator plate is positioned in a manner to form a clearance, through which air flow from said fan passes from said moderator to said air filter frame, between the end of said moderator and the housing.

4. An air cleaner according to claim 3, wherein said moderator plate has, on its end, a blocking plate with a certain length along said clearance, said blocking plate functioning to prevent air flow from said fan from flowing around said fan casing.

5. An air cleaner according to claim 1, wherein said casing is eccentrically positioned within said housing of the fan module to create a large space in front of the outlet of said fan casing.

6. An air cleaner according to claim 5, wherein said two adjacent housings in which the fan casings face each other with respect to their outlets are divided by a partition in such a manner that the end portion of the outlet of the casing in the housing is connected by said partition to the end portion of the outlet of the other casing, thereby regulating the direction of each of the air flows from said fan casings.

* * * * *